(No Model.)

H. G. MORRIS.
EVAPORATING APPARATUS.

No. 489,260. Patented Jan. 3, 1893.

Witnesses:
A. V. Groupe
Alex Barkoff

Inventor:
Henry G. Morris
by his Attorneys
Howson & Howson

UNITED STATES PATENT OFFICE.

HENRY G. MORRIS, OF PHILADELPHIA, PENNSYLVANIA.

EVAPORATING APPARATUS.

SPECIFICATION forming part of Letters Patent No. 489,260, dated January 3, 1893.

Application filed January 16, 1892. Serial No. 418,228. (No model.)

*To all whom it may concern:*

Be it known that I, HENRY G. MORRIS, a citizen of the United States, and a resident of Philadelphia, Pennsylvania, have invented certain Improvements in Evaporating-Pans, of which the following is a specification.

The object of my invention is to provide an apparatus for concentrating liquids in which positive circulation of the same in a given direction is maintained; and one that shall have all its parts readily accessible for cleaning and repairs, and that can be constructed at a moderate cost.

My invention consists essentially of two parts, in one of which the liquid is heated to the temperature of evaporation, and in the other the steam formed is separated from the liquid, means being provided for the circulation of the liquid between the two parts of the apparatus, to insure this result.

Figure 2:
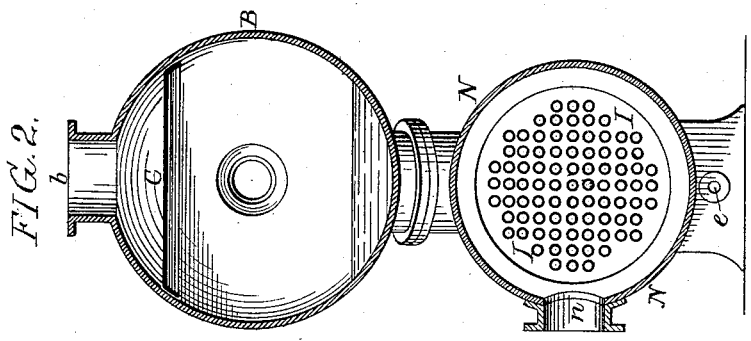
Figure 1:
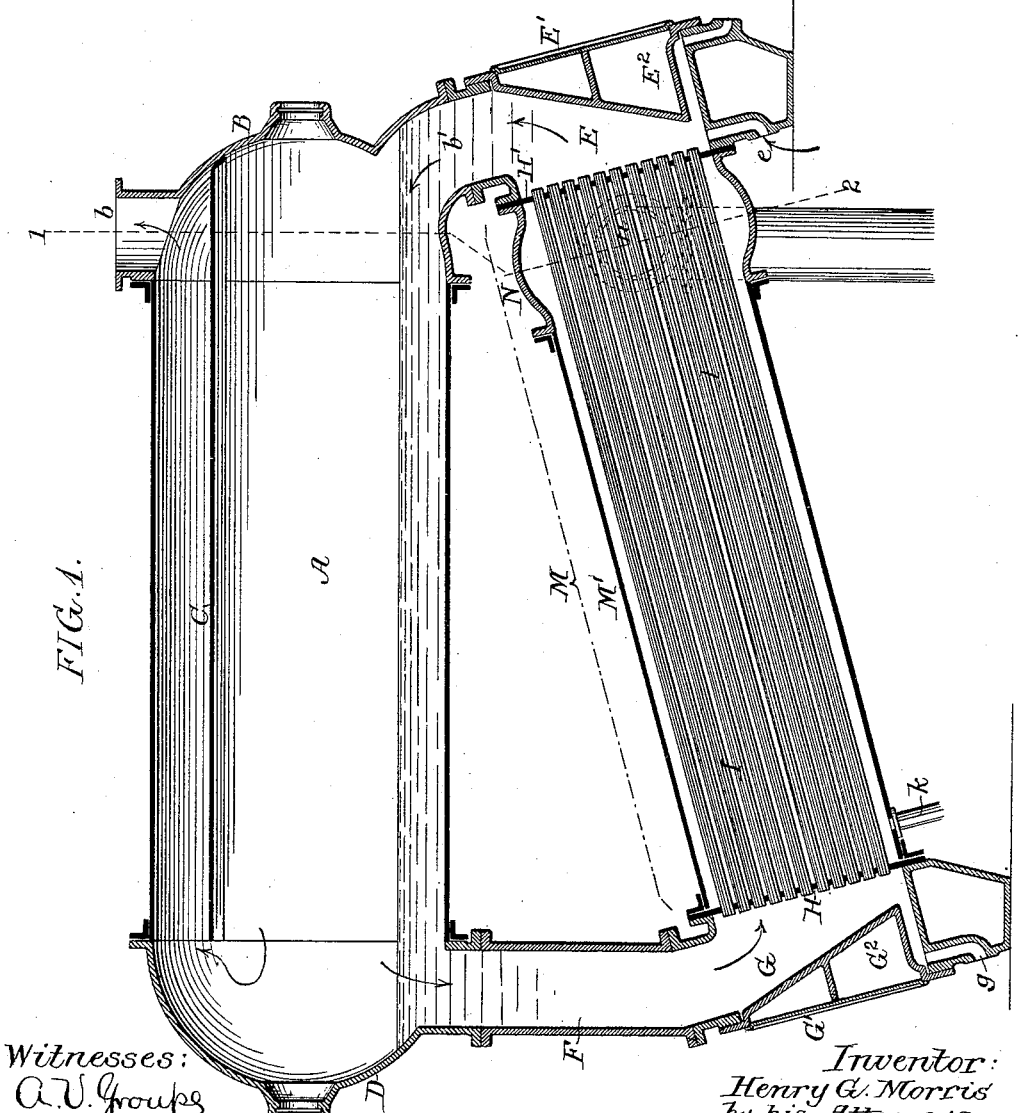

In the accompanying drawings:—Figure 1, is a longitudinal section of my improved evaporator; and Fig. 2 is a transverse section on the line 1—2, Fig. 1.

M is an inclined steam drum, in which are tubes I secured to tube sheets H, H' at each end of the drum M. The steam drum M is made in the present instance in two parts M' and N. The part N has the inlet opening $n$ for the heating fluid, and is preferably made of cast metal, and bolted to the part M' and head E'. The tubes I communicate with chambers E and G in the heads E' and G'. These heads are provided with covers which may be readily removed when it is desired to inspect, repair, or clean the tubes. The chambers E and G communicate with a separating drum A, having in the present instance, heads B and D. The chamber E communicates with the drum A through a passage $b'$, and the chamber G communicates with the drum A through the pipe F. The drum A is provided with a baffle plate C, and an outlet branch $b$ for the escape or withdrawal of the steam.

The liquid to be concentrated is admitted to the apparatus through the passage $e$ to the chamber E, filling the several compartments and the bottom of the separating drum A, and when concentrated to the proper density, is withdrawn through the passage $g$. Steam for heating the liquid is admitted to the drum M through a pipe $n$, which communicates with the drum preferably near the head E'. The liquid of condensation is taken off through the pipe $k$ at the lowest end of the drum.

The apparatus is provided with the usual testing instruments, gages, and valves, and the covers of the chambers E and G have extensions $E^2$ and $G^2$ of such form as will direct the flow of liquid between the heating and separating drums with the least obstruction.

In the multiple effect system of concentrators, the liquid is drawn from one vessel of the series to the other at a temperature higher than the boiling point of the liquid in the pan that it enters, and as it is usually arranged, it vaporizes on entering the same, and causes entrainment of the liquid. To remedy this without forming interfering currents, and at the same time to form a current that shall aid the circulation, I admit the hot liquid into the chamber E at the point $e$, and it, in rising through the cooler liquid in the vessel will be thoroughly mixed and reduced to the temperature in that part of the vessel, thus preventing any foaming or entrainment from the cause mentioned. The baffle plate C also compels the vapor arising to take a circuitous course to the outlet $b$, also preventing any entrainment from sudden application of excessive heat in the heating drum.

I claim as my invention:—

1. In a concentrator, the combination of a separating drum, chambered heads communicating therewith, inclined tubes connected to the said heads, whereby complete circulation is maintained, an inclined heating drum situated between the heads and incasing the tubes with a steam inlet, whereby steam is admitted to the drum to heat the liquid in the tubes, substantially as specified.

2. The combination of the separating drum A, the inclined tubes I, a heating drum M incasing said tubes, chambered heads E and G, communicating with the tubes, and deflectors $E^2$ and $G^2$, in said heads where the flow of liquid is directed with the least obstruction, substantially as specified.

3. The combination of the separating drum A, a head B secured thereto, an outlet passage in said head, a chambered head E secured to the head B, and having an inlet for the liquid, a head D secured to the opposite end of the separating drum, a chambered head G connected to said head D, tube sheets H, H', circulating tubes secured to said tube sheets, and an inclosing casing for said tubes, substantially as described.

4. The combination of the separating drum, chambered heads communicating with said separating drum, inclined tubes communicating with said chambered heads, and a drum M and coupling head N inclosing the tubes, said coupling head having an inlet passage for the heating fluid, substantially as described.

In testimony whereof I have signed my name to this specification in the presence of two subscribing witnesses.

HENRY G. MORRIS.

Witnesses:
EUGENE ELTERICH,
HENRY HOWSON.